United States Patent
Lee

(10) Patent No.: US 6,628,972 B1
(45) Date of Patent: Sep. 30, 2003

(54) POWER SAVING METHOD OF MOBILE TELEPHONE

(75) Inventor: Sang-Seo Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/366,296

(22) Filed: Aug. 2, 1999

(30) Foreign Application Priority Data

Jul. 31, 1998 (KR) ......................................... 1998-31225

(51) Int. Cl.$^7$ ................................................. H04B 1/38
(52) U.S. Cl. ..................................... 455/574; 455/343
(58) Field of Search .............................. 455/127, 343, 455/574; 340/7.32, 7.38

(56) References Cited

U.S. PATENT DOCUMENTS

| | | | | |
|---|---|---|---|---|
| 5,574,996 A | * | 11/1996 | Raith | 455/161.3 |
| 5,590,396 A | * | 12/1996 | Henry | 455/33.1 |
| 5,596,571 A | * | 1/1997 | Gould et al. | 370/335 |
| 5,838,720 A | * | 11/1998 | Morelli | 375/219 |
| 5,842,141 A | * | 11/1998 | Vaihoja et al. | 455/574 |
| 5,857,146 A | * | 1/1999 | Kido | 340/7.34 |
| 6,157,816 A | * | 12/2000 | Anderson et al. | 455/38.3 |
| 6,223,047 B1 | * | 4/2001 | Ericsson | 455/517 |
| 6,240,288 B1 | * | 5/2001 | Wan et al. | 455/426 |
| 6,289,227 B1 | * | 9/2001 | Shi | 455/574 |
| 6,317,593 B1 | * | 11/2001 | Vossler | 455/414 |
| 6,331,971 B1 | * | 12/2001 | Raith | 370/311 |
| 6,332,086 B2 | * | 12/2001 | Avis | 455/574 |

FOREIGN PATENT DOCUMENTS

CN 1111886 A 11/1995

OTHER PUBLICATIONS

Chinese First Office Action dated Nov. 8, 2002, issued in a counterpart application, namely Appln. No. 99111839.1.

* cited by examiner

Primary Examiner—Nay Maung
Assistant Examiner—Tu Nguyen
(74) Attorney, Agent, or Firm—Dilworth & Barrese, LLP

(57) ABSTRACT

A power saving method of a mobile telephone. The power saving method includes the steps of: setting a power saving time period; if present time coincides with the set time, implementing a power saving function; and designating a cycle for checking a paging channel slot, and checking the paging channel slot by supplying a power of a battery to a radio frequency control part every designated cycle.

7 Claims, 5 Drawing Sheets

5-MOBILE STATION'S ASSIGNED PAGING CHANNEL SLOT

POWER SAVING METHOD OF MOBILE TELEPHONE

PRIORITY

This application makes reference to, incorporates the same herein, and claims all benefits accruing under 35 U.S.C. §119 from an application entitled METHOD FOR SAVING A POWER OF BATTERY IN A PORTABLE COMMUNICATION TERMINAL earlier filed in the Korean Industrial Property Office on Jul. 31, 1998, and there duly assigned Serial No. 98-031225.

BACKGROUND OF THE INVENTION

1. Field of the Invention

The present invention relates to a power saving method of a mobile telephone, and more particularly, to a method for saving the power of a mobile telephone by lengthening the paging check cycle at a preset time.

2. Description of the Related Art

A mobile communication terminal using a CDMA (Code Division Multiple Access) system checks the paging channel periodically by using a channel slot system as shown in FIG. 1. The mobile communication terminal has a parameter called a slot cycle index and checks the paging channel during one designated slot in the slot cycle. If the slot cycle of the mobile communication terminal contains 16 slots (1.28 seconds), the mobile communication terminal powers on an RF (Radio Frequency) controller only for one slot (80 milliseconds). In FIG. 1, it is assumed that the fifth slot is the one slot for checking the paging channel. Thus, the mobile communication terminal, such as a mobile telephone, supplies power to the RF controller for only one slot out of 16.

Consequently, the mobile telephone periodically checks the paging channel by supplying a power to the RF controller for one slot every 16 slots even at a time when the mobile telephone is rarely used. Consequently, since the slot cycle for checking the paging channel is short, the battery of the mobile telephone is rapidly consumed.

SUMMARY OF THE INVENTION

An object of the present invention is to provide a method for saving the power of the battery in a mobile telephone by selectively varying the slot cycle for checking the paging channel at a preset time.

Another object of the present invention is to provide a method for reducing the power consumption of the battery in a mobile telephone by half in an idle state by doubling the paging channel slot cycle to a 32-slot cycle at a time when the mobile telephone is rarely used.

To achieve these and other objects of the present invention, there is provided a power saving method of a mobile telephone, including the steps of: setting a designated power saving time period; starting the power saving function at the designated time period; designating a cycle for checking a paging channel slot, and checking the paging channel slot by supplying a power of a battery to a radio frequency control part every designated cycle.

BRIEF DESCRIPTION OF THE DRAWINGS

These and other objects, features and advantages of the present invention will become more apparent from the following detailed description when taken in conjunction with the accompanying drawings in which.

DETAILED DESCRIPTION OF THE PREFERRED EMBODIMENT

Figure 2:
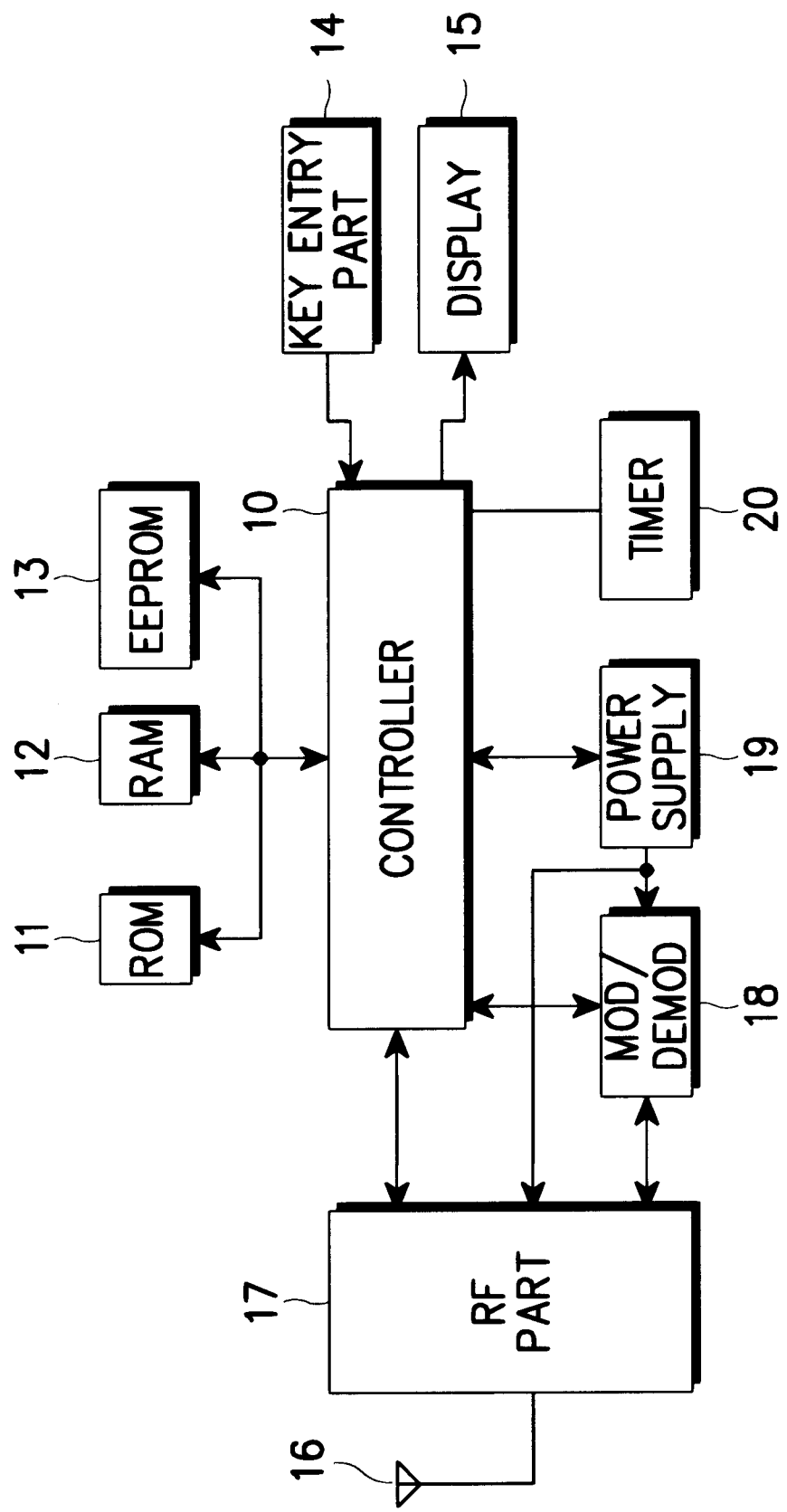
FIG. 2 is a block diagram of a mobile telephone according to the present invention.

FIG. 2 shows a controller 10 which controls the overall operation of a mobile telephone. The controller 10 controls the power of the battery by lengthening the cycle for checking the paging channel during a preset time. A Read Only Memory (ROM) 11 stores a program executed by the mobile telephone. A Random Access Memory (RAM) 12 temporarily stores data generated when the mobile telephone implements the program. An Electrically Erasable and Programable Read Only Memory (EEPROM) 13 stores the unique identification of the mobile telephone and stores data necessary for processing a call. A key entry part 14 has numeral keys for dialing and has function keys such as a menu key and a select key. The key entry part 14 generates key data by external key manipulation and supplies the key data to the controller 10. A display 15, a Liquid Crystal Display (LCD) for example, displays data under the control of the controller 10. A radio frequency (RF) part 17 tuned to an RF channel amplifies a received audio signal and converts an RF signal received from an antenna 16 into an intermediate frequency (IF) signal. A modulator/demodulator 18 modulates and demodulates a digital signal. A power supply 19 supplies power to the modulator/demodulator 18 and the RF part 17 under the direction of the controller 10. A timer 20 counts is present time and notifies the controller 10 of the present time.

Figure 3:
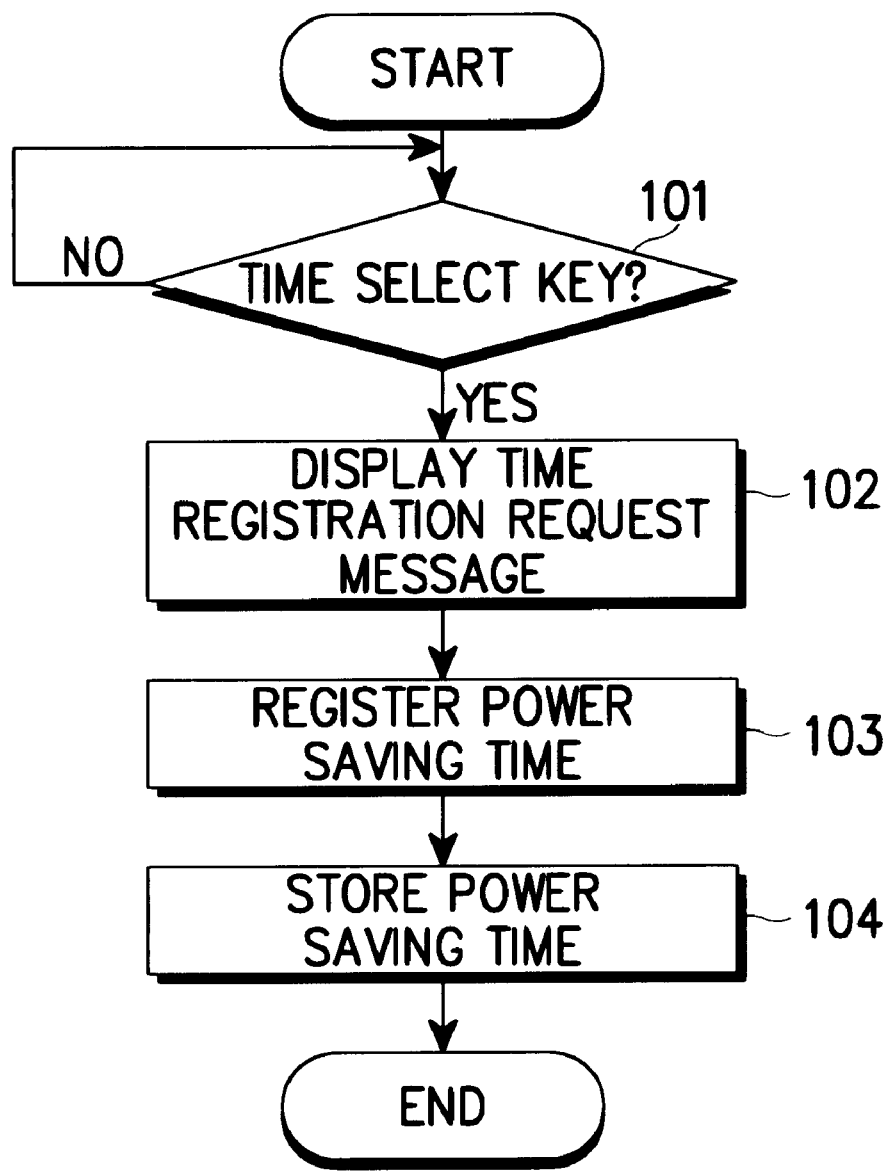
FIG. 3 is a flow chart showing the control process for setting the power saving time period according to the present invention.

The control process for setting the power saving time period is shown in FIG. 3. In order to set the specific time period during which the power saving function is used, for example, when the mobile phone is rarely used, the user presses the time select key. The controller 10 checks if the time select key is pressed at step 101. If it is pressed, a message requesting that the power saving time period be entered is displayed on the display 15 at step 102. The user enters the power saving time period, for example, 24:00–06:00, through the key entry part 14 at step 103. The power saving time period is stored in the RAM 12 at step 104.

Figure 4:
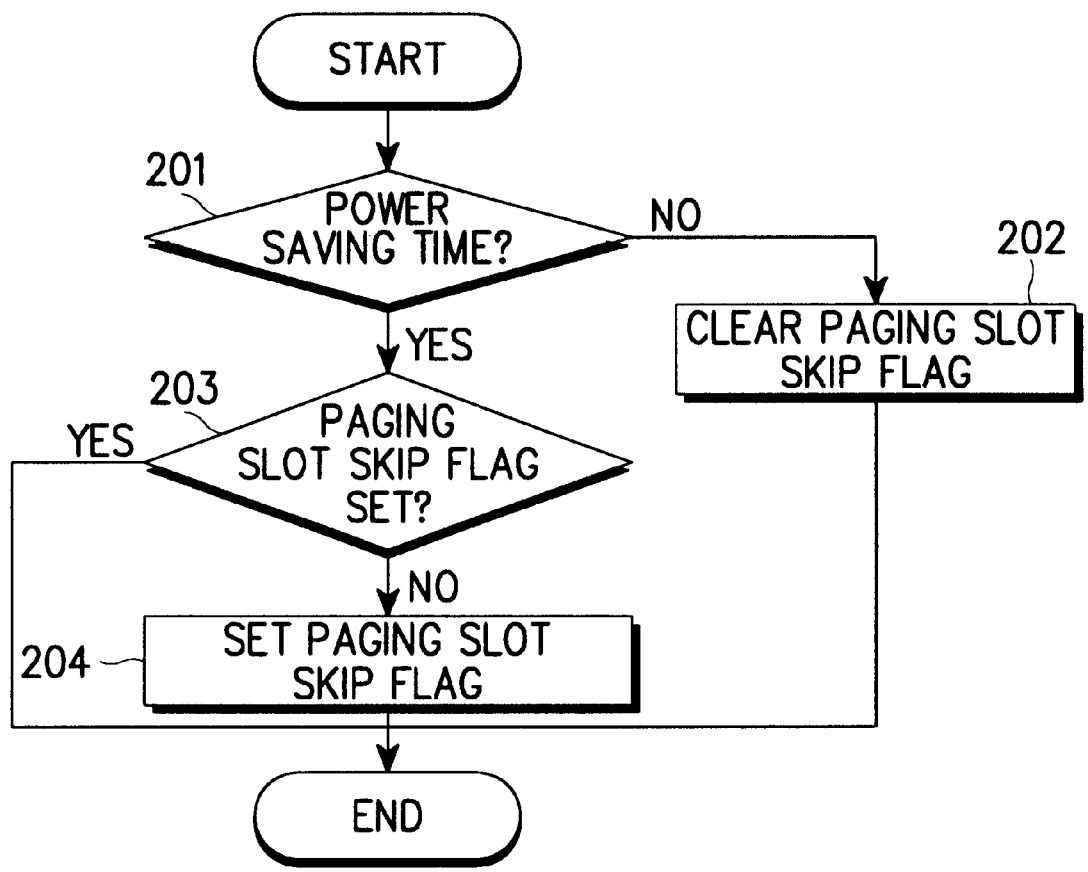
FIG. 4 is a flow chart showing the control process for starting the power saving function according to the present invention.

FIG. 4 illustrates the control process for starting the power saving function when the set power saving time period is reached. The controller 10 monitors if the present time coincides with the set power saving time period, for example, 24:00–06:00 at step 201. If not, the controller 10 clears a paging slot skip flag at step 202. If the present time coincides with the set power saving time period, the controller 10 checks if the paging slot skip flag has been set at step 203. If it has not been set, the controller 10 sets the paging slot skip flag at step 204.

Figure 1:
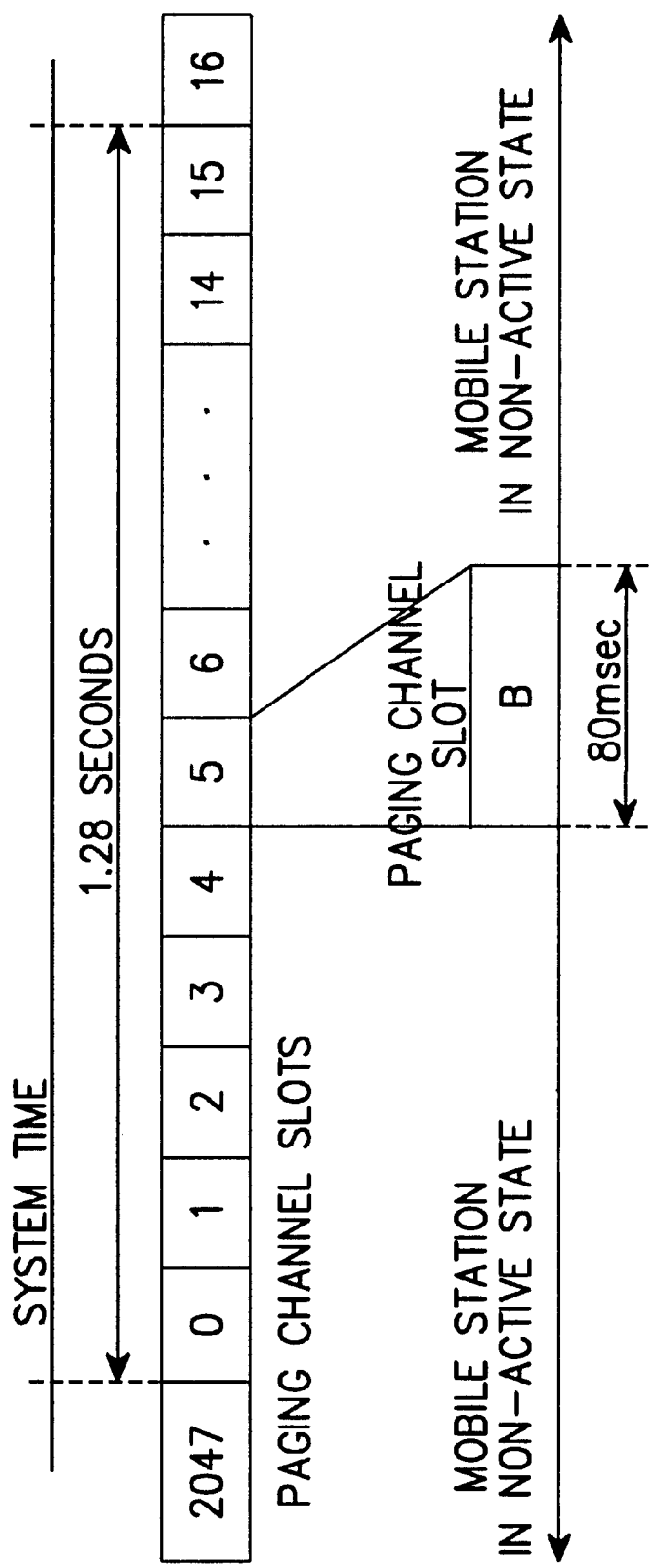
FIG. 1 is an exemplary diagram of a paging channel slot mode of a general mobile communication terminal.
Figure 5:
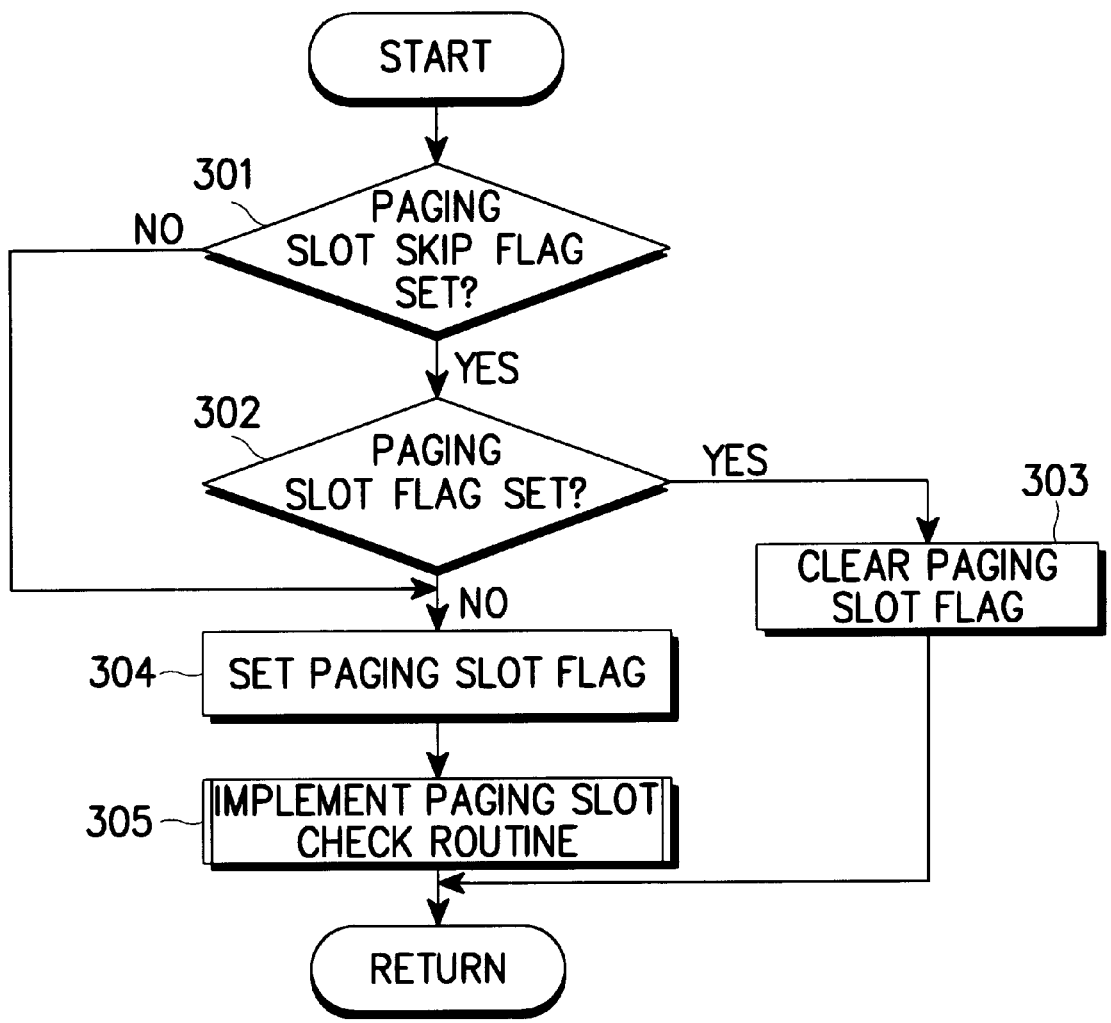
FIG. 5 is a flow chart showing the control process for implementing the power saving function according to the present invention.

FIG. 5 shows the control process for implementing the power saving function. The controller 10 checks if the paging slot skip flag has been set at step 301. If it has not been set, the controller 10 sets the paging slot flag at step 304. At step 305, the controller 10 executes the paging slot check cycle. During the one designated paging slot in the cycle, the controller 10 directs the power supply 19 to supply power to the RF part 17 and the modulator/demodulator 18 and checks the paging channel. In FIG. 1, for example, the power would be on during the fifth paging channel slot (80 milliseconds) every 16 slots (1.28 seconds).

At step 301, the controller 10 checks if the paging slot skip flag has been set. If it has, the controller 10 checks if the paging slot flag has been set at step 302. If so, the controller 10 clears the paging slot flag at step 303 and then returns to step 301 without checking the paging channel slot for the 16-slot cycle (1.28 seconds). If the paging slot flag has not been set, step 302 is followed by step 304 to set the paging slot flag. At step 305, the controller 10 controls the power supply 19 to supply a power to the RF part 17 and the modulator/demodulator 18, and implements the paging slot check routine for the designated paging channel slot (80 milliseconds). Thus the paging channel slot is checked every 32 slots (2.56 seconds). As a result, since the paging channel slot is checked not every 16 slots but every 32 slots, the power consumption of a battery can be reduced by half.

As described above, a cycle for checking a paging channel slot is lengthened to 32 slots (2.56 seconds) from 16 slots (1.28 seconds) for the set power saving time. Therefore, the power consumption of a battery is reduced and the time during which the battery can be used is lengthened.

While the invention has been shown and described with reference to a certain preferred embodiment thereof, it will be appreciated by those skilled in the art that the present invention is not limited to the specific embodiment illustrated above. For example, the cycle for checking a paging channel slot may be 64 or 128 slots. Therefore, the present invention should be understood as including all possible embodiments and modifications which do not depart from the spirit and scope of the invention as defined by the appended claims.

What is claimed is:

1. A power saving method in a mobile telephone, comprising the steps of:

setting a power saving time period;

monitoring for coincidence of the power saving time period and the present time;

designating a cycle length for checking a paging channel; and when coincidence is reached, lengthening the cycle for checking the paging channel;

wherein said lengthening step further comprises the steps of:

monitoring for the set power saving time period;

if the set power saving time period does not coincide with the present time, clearing a paging slot skip flag and returning to said monitoring step;

if the set power saving time coincides with the present time, checking the paging slot skip flag;

if the paging slot skip flag is set, returning to the monitoring step;

if the paging slot skip flag is not set, setting the slot skip flag; and returning to monitoring.

2. The power saving method as claimed in claim 1, wherein said setting step comprises the steps of:

pressing a time select key;

selecting the power saving time period; and storing the selected time period.

3. The power saving method as claimed in claim 2, further comprising the step of displaying a message requesting that the power saving time period should be selected after said pressing step.

4. The power saving method in claim 1, wherein said lengthening step further comprises the steps of:

checking if the paging slot skip flag is set;

if the paging slot skip flag is not set, setting a paging slot flag, implementing a paging slot check routine, and returning to said checking step;

if the paging slot skip flag is set, checking if the paging slot flag is set;

if the paging slot flag is set, clearing the paging slot flag and returning to said checking step; and if the paging slot flag is not set, setting the paging slot flag, implementing a paging slot check routine and returning to said checking step.

5. The power saving method in claim 4, wherein said steps of checking and setting, as well as flags, are increased in number in order to lengthen the paging slot cycle any integer number of times.

6. The power saving method in claim 4, wherein said paging slot check routine having a time index consisting of individual slots, one of which is designated as the slot when the paging channel is checked, said paging slot check routine comprising the steps of:

cycling through the individual slots in the index;

when the designated slot is reached, powering on a communication controller in order to check the paging channel;

continuing cycling through to the end of the index; and discontinuing the routine.

7. A power saving method of a mobile telephone, comprising the steps of:

setting a power saving time period; and during the power saving time period, lengthening a cycle for checking a paging channel;

wherein said lengthening step further comprises the steps of:

monitoring for the set power saving time period;

if the set power saving time period does not coincide with a present time, clearing a paging slot skip flag and returning to a monitoring step;

if the set power saving time coincides with the present time, checking the paging slot skip flag;

if the paging slot skip flag is set, returning to the monitoring step;

if the paging slot skip flag is not set, setting the slot skip flag; and returning to monitoring.

* * * * *